(12) United States Patent
Colletti et al.

(10) Patent No.: US 9,043,584 B2
(45) Date of Patent: May 26, 2015

(54) GENERATING HARDWARE EVENTS VIA THE INSTRUCTION STREAM FOR MICROPROCESSOR VERIFICATION

(75) Inventors: Christopher Lee Colletti, Austin, TX (US); Bryan Glen Hickerson, Cedar Park, TX (US); Michael Joseph Schiffli, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 12/843,594

(22) Filed: Jul. 26, 2010

(65) Prior Publication Data

US 2012/0023315 A1     Jan. 26, 2012

(51) Int. Cl.
| | |
|---|---|
| *G06F 15/00* | (2006.01) |
| *G06F 7/38* | (2006.01) |
| *G06F 9/00* | (2006.01) |
| *G06F 9/44* | (2006.01) |
| *G06F 9/30* | (2006.01) |
| *G06F 11/22* | (2006.01) |
| *G06F 11/263* | (2006.01) |

(52) U.S. Cl.
CPC ........ *G06F 9/30145* (2013.01); *G06F 9/30094* (2013.01); *G06F 11/2215* (2013.01); *G06F 11/263* (2013.01)

(58) Field of Classification Search
None
See application file for complete search history.

(56) References Cited

U.S. PATENT DOCUMENTS

| | | | | |
|---|---|---|---|---|
| 5,774,358 | A  * | 6/1998  | Shrote | 700/86 |
| 6,564,339 | B1 | 5/2003  | Swoboda et al. | 714/30 |
| 7,287,185 | B2 | 10/2007 | Safford et al. | 714/11 |
| 2004/0059904 | A1* | 3/2004  | Sonnekalb | 713/1 |
| 2005/0125791 | A1* | 6/2005  | Welbon et al. | 718/100 |
| 2006/0259750 | A1 | 11/2006 | Swoboda | 712/227 |
| 2006/0259774 | A1 | 11/2006 | Swoboda et al. | 713/176 |
| 2009/0204785 | A1 | 8/2009  | Yates, Jr. et al. | 711/205 |
| 2010/0242025 | A1* | 9/2010  | Yamazaki et al. | 717/127 |

* cited by examiner

*Primary Examiner* — George Giroux
(74) *Attorney, Agent, or Firm* — Van Leeuwen + Van Leeuwen; William J. Stock

(57) ABSTRACT

A processor receives an instruction operation (OP) code from a verification system. The instruction OP code includes instruction bits and forced event bits. The processor identifies a forced event based upon the forced event bits, which is unrelated to an instruction that corresponds to the instruction bits. In turn, the processor executes the forced event.

21 Claims, 10 Drawing Sheets

125
| Instruction OP Code ||
|---|---|
| Instruction Bits | Forced Event Bits (Unused Bit Locations) |

| Forced Event Bits || Event |
|---|---|---|
| Event Type Bits | Stage Bits | |
| 0 | 0 | 0 | 0 | None |
| 0 | 1 | 0 | 0 | Flush (stage 0) |
| 1 | 0 | 1 | 1 | Reject (stage 3) |
| 1 | 1 | 1 | 0 | Error-Inject (stage 2) |

GENERATING HARDWARE EVENTS VIA THE INSTRUCTION STREAM FOR MICROPROCESSOR VERIFICATION

TECHNICAL FIELD

The present disclosure relates to generating forced events during microprocessor verification using forced event bits that are included in unused bit locations in an instruction operation (OP) code.

BACKGROUND

An electronics manufacturer, prior to releasing an electronic device to the industry, typically proceeds through a series of hardware simulation tests and hardware verification tests. Hardware simulation tests utilize software models that represent the hardware architecture (e.g., VHDL models) and hardware verification testing typically involves testing an actual electronic device. During the hardware simulation tests and hardware verification tests, the electronic manufacturer's objective is to fully test the electronic device, which includes placing the electronic device in various architectural states and monitoring the device's outcome.

SUMMARY

A processor receives an instruction operation (OP) code from a verification system. The instruction OP code includes instruction bits and forced event bits. The processor identifies a forced event based upon the forced event bits, which is unrelated to an instruction that corresponds to the instruction bits. In turn, the processor executes the forced event.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 5A is an exemplary diagram of an instruction OP code;

FIG. 5B is an exemplary diagram of a forced event table showing various forced event bit scenarios;

DETAILED DESCRIPTION

Figure 1:
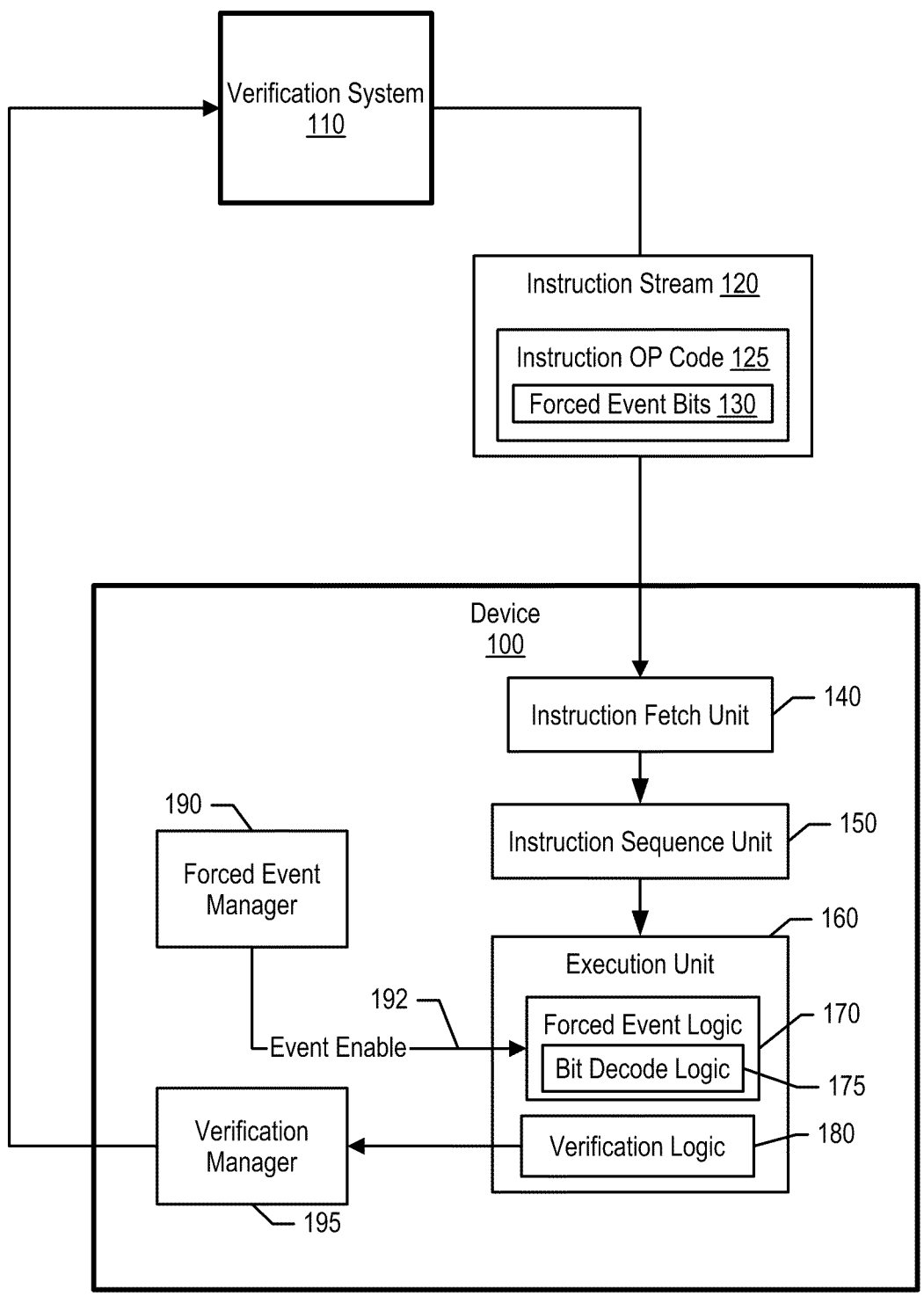
FIG. 1 is an exemplary diagram showing a device identifying forced event bits included in an instruction operation (OP) code and invoking forced events during design verification in order to test complex micro-architectural scenarios.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language, VHDL (Very High Speed Integrated Circuit Hardware Description Language), or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is an exemplary diagram showing a device identifying forced event bits included in an instruction operation (OP) code and invoking forced events during design verification in order to test complex micro-architectural scenarios. In one embodiment, verification system 110 tests device 100's complex micro-architectural scenarios (states) during device simulation. In this embodiment, verification system 110 is part of a hardware simulation system that provides instruction stream 120 to a simulated version of device 100 (e.g., VHDL code). In another embodiment, verification system 110 tests device 100's complex micro-architectural states during hardware verification. In this embodiment, verification system 110 passes instruction stream 120 to device 100, which is an actual device such as a microprocessor. As those skilled in the art can appreciate, complex micro-architectural states are processor states that, prior to this disclosure, result after exhaustive and lengthily processor testing (e.g., numerous internal state scenarios and numerous clock cycles) due to their inherent occurrence improbability.

Instruction stream 120 includes instruction OP code 125, which corresponds to a particular instruction such as a "load" instruction. Instruction OP code 125 includes instruction bits that identify the instruction (e.g., "load" instruction) as well as unused bit locations (bit locations not filled by an instruction bit). Verification system 110 includes forced event bits 130 into the unused bit locations, which correspond to a particular forced event and may also indicate a time at which to invoke the force event (pipeline trigger stage) (see FIG. 5A, 5B, and corresponding text for further details).

Device 100 loads instruction OP code 125 into instruction fetch unit 140. In turn, instruction fetch unit 140 passes instruction OP code 125 to instruction sequence unit 150. Instruction sequence unit 150 identifies a corresponding execution unit 160, typically from multiple execution units, for which to pass instruction OP code 125. As those skilled in the art will appreciate, instruction sequence unit 150 sends instruction OP code 125 to a particular execution unit based upon instruction OP 125's type. For example, if instruction OP code 125 is a "load" instruction, instruction sequence unit 150 passes instruction OP code 125 to a load/store execution unit.

Execution unit 160 includes forced event logic 170, which includes bit decode logic 175. Forced event logic 170 receives event enable signal 192 from forced event manager 190, which enables forced event logic 170 to monitor forced event bits 130 and invoke forced events accordingly. For example, verification system 110 may instruct forced event manager 190 to enter a "verification mode" and, in this mode, forced event manager 190 activates event enable signal 192. During normal operation, however, forced event manager 190 disables event enable signal 192, thus disabling forced event logic 170 from invoking forced events.

Execution unit 160 receives instruction OP code 125 and loads instruction OP code 125's instruction bits into an execution pipeline for execution. Concurrently, bit decode logic 175 decodes forced event bits 130 and identifies the forced event, along with a pipeline trigger stage to invoke the forced event if applicable. For example, instruction OP code 125 may include instruction bits for a "lfsx" (load floating point single indexed) instruction and also include forced event bits that indicate a forced "flush" event at pipeline stage "2." In this example, execution unit 160 loads the "lfsx" instruction bits into the pipeline and, when the instruction bits reach the pipeline's second stage, forced event logic 170 invokes a forced flush event, which causes execution unit 160 to flush the pipeline (see FIG. 6 and corresponding text for further details).

Execution unit 160 also includes verification logic 180, which monitors execution unit 160 and detects when execution unit 160 generates invalid data (or enters an invalid state) due to the forced event. If so, verification logic 180 informs verification manager 195 that, in turn, informs verification system 110 of the verification error (see FIG. 7 and corresponding text for further details).

In one embodiment, instead of including forced event bits in instruction OP code 125's unused bit locations, verification system 110 may modify unused instruction OP codes (NO-OP instructions) into "forced event" OP codes that are devoid of instruction bits. In this embodiment, verification system 110 includes the forced event OP codes into instruction stream 120 at appropriate locations to invoke a forced event.

Figure 2:
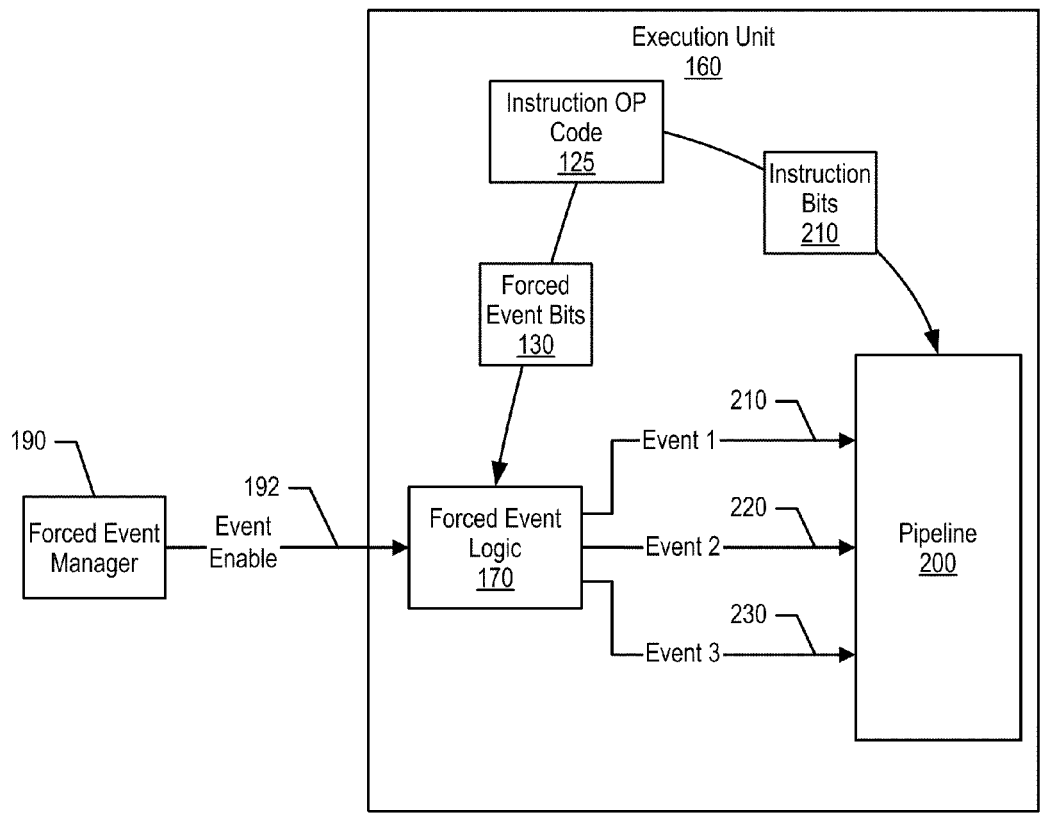
FIG. 2 is an exemplary diagram showing forced event logic invoking different types of forced events based upon forced event bits included in an instruction OP code's unused bit locations.

FIG. 2 is an exemplary diagram showing forced event logic invoking different types of forced events based upon forced event bits included in an instruction OP code's unused bit locations. Execution unit 160 includes forced event logic 170 and pipeline 200. Execution unit 160 receives instruction OP code 125, which includes instruction bits 210 and forced event bits 130. Execution unit 160 loads instruction bits 210 into pipeline 200, and passes forced event bits 130 to forced event logic 170.

In turn, assuming that forced event manager 190 enables event enable signal 192, forced event logic 170 (e.g., bit decode logic 175) decodes forced event bits 130 and invokes a particular forced event. The embodiment shown in FIG. 2 shows that forced event logic 170 may invoke one of three different events (event 1 210, event 2 220, event 3 230), such as a forced flush event, a forced reject event, and a forced error-inject event. In addition, forced event logic 170 may invoke one or more of the three events when instruction bits 210 reach a particular pipeline stage based upon whether forced event bits 130 includes pipeline trigger stage bits (see FIG. 5B and corresponding text for further details).

Figure 3:
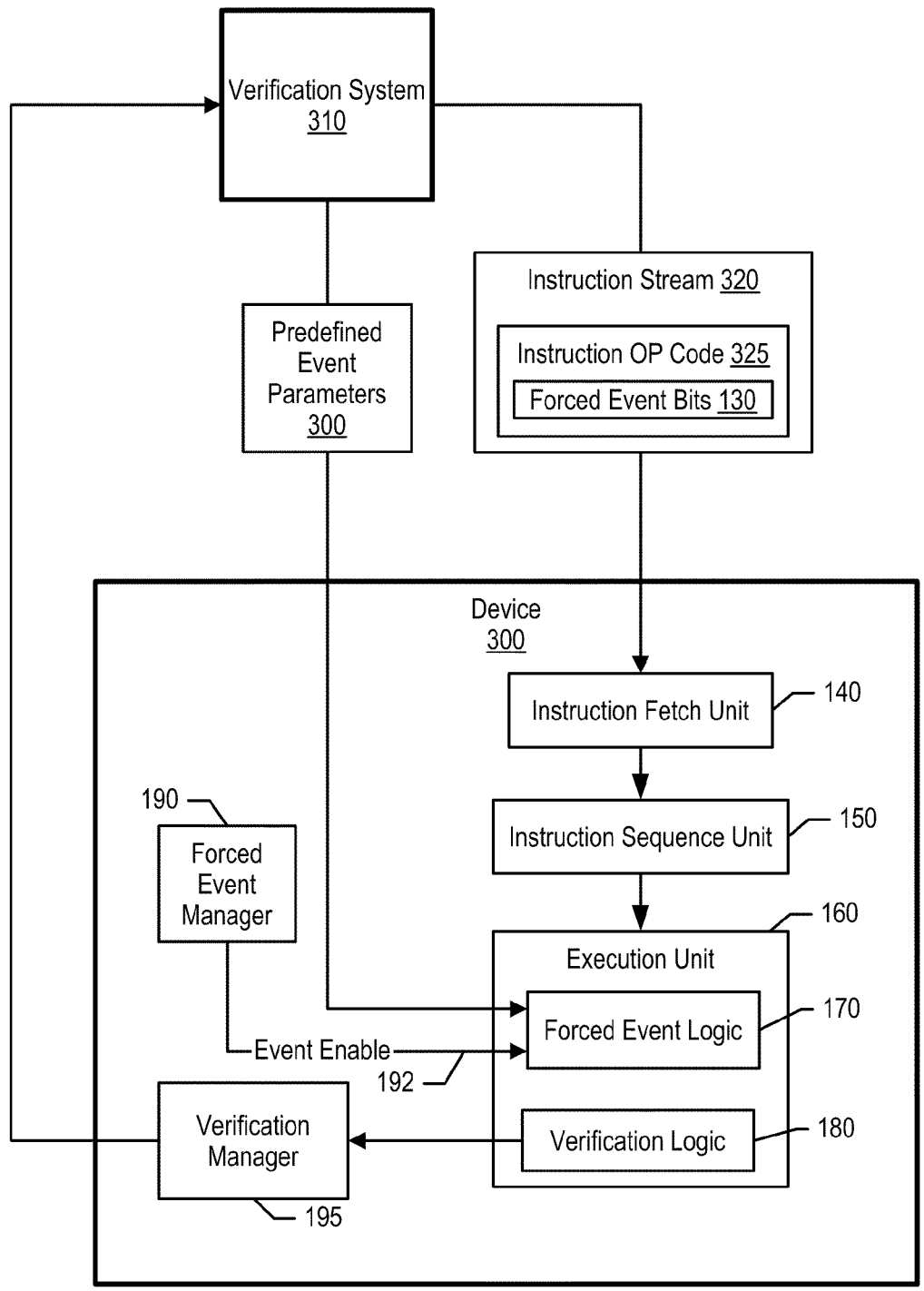
FIG. 3 is an exemplary diagram showing a verification system providing predefined event parameters to a device in order to "pre-program" a particular forced event.

FIG. 3 is an exemplary diagram showing a verification system providing predefined event parameters to a device in order to "pre-program" a particular forced event. FIG. 3 is similar to FIG. 1 with the exception that verification system 310 provides predefined event parameters 300 to device 300 prior to sending instruction stream 320 to device 300. In this embodiment, forced event logic 170 configures its logic based upon the received parameters to invoke a particular forced event when forced event bits 130 indicate as such. For example, predefined event parameters 300 may instruct forced event logic 170 to invoke a flush event when a corresponding instruction reaches a second pipeline stage. In this embodiment, forced event logic 170 configures itself accordingly (e.g., sets latches, etc.), and begins monitoring forced event bits 130. When forced event bits indicate a forced event (e.g., a set bit), forced event logic 170 invokes the corresponding forced event when instruction OP code 325's instruction bits reach the corresponding pipeline trigger stage.

Figure 4:
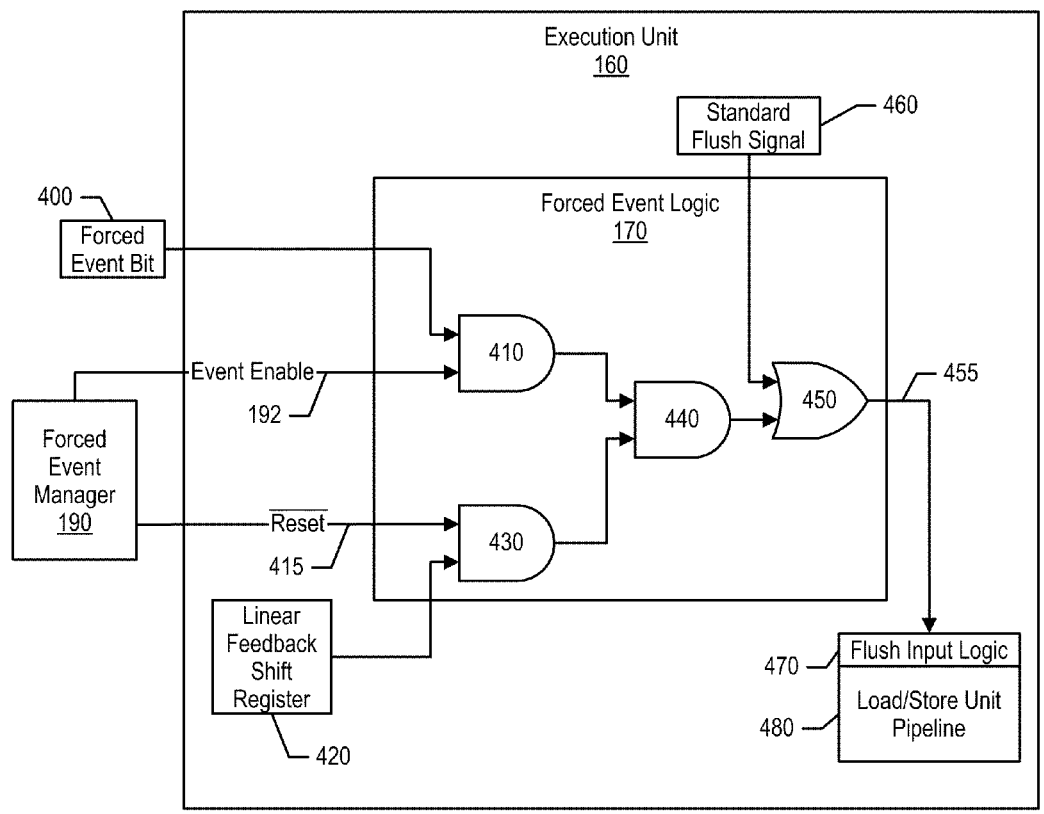
FIG. 4 is an exemplary diagram of a simplified embodiment of invoking forced events.

FIG. 4 is an exemplary diagram of a simplified embodiment of invoking forced events. FIG. 4 shows an embodiment of forced event logic 170 invoking a forced event when it receives a particular forced event bit (forced event bit 400). Forced event logic 170 invokes event signal 455 primarily based upon forced event bit 400 and event enable signal 192. When both are high, gate 410's output is high, which feeds into gate 440.

Reset signal 415 and linear feedback shift register 420 feed into gate 430, which are both normally high until forced event manager 190 performs a reset, such as when execution unit 160 enters into an invalid state (discussed below). Since gate 440's inputs are both high, gate 440's output is high, which feeds into gate 450. Execution unit 160's standard flush signal 460 also feeds into gate 450. When gate 440's output is high, gate 450's output 455 becomes high, thus invoking flush input logic 470 to flush load/store unit pipeline 480.

During times when load/store unit pipeline 480 enters an invalid state or generates invalid data, execution unit 160 may reset load/store unit pipeline 480 by activating reset signal 415 and invoking linear feedback shift register 420 to send random bits into gate 430. In turn, signal 455 randomly switches between high and low, thus resetting flush input logic 470 and load/store unit pipeline 480 unless, of course, execution unit 160 invokes standard flush signal 460. Execution unit 160 utilizes linear feedback shift register 420 to prevent live-lock/deadlock situations (e.g., two competing actions are not progressing). As those skilled in the art can appreciate, forced event manager 190 may use other mechanisms to reset load/store unit pipeline 480, such as disabling forced event bit 192.

FIG. 5A is an exemplary diagram of an instruction OP code. As discussed herein, instruction OP code 125 includes instruction bits 210 and unused bit locations (e.g., bit locations 31-33) that include forced event bits 130. As such, a verification manager includes forced event bits 130 into the unused bit locations in order to specify a particular forced event and a particular pipeline trigger stage (see FIG. 5B and corresponding text for further details).

FIG. 5B is an exemplary diagram of a forced event table showing various forced event bit scenarios. Table 510 includes entries that specify a forced event and a pipeline trigger stage. Columns 520-530 include event type bits that specify a particular forced event, and columns 540-550 include pipeline trigger stage bits that specify a point at which to invoke the forced event. Column 560 includes a description of the corresponding forced event and pipeline trigger stage. In one embodiment, the forced event is independent from the pipeline trigger stage. Meaning, a "flush" forced event may have a corresponding pipeline trigger stage of stage 0, stage 1, stage 2, or stage 3, depending upon the pipeline trigger stage bits included in the forced event bits.

Figure 6:
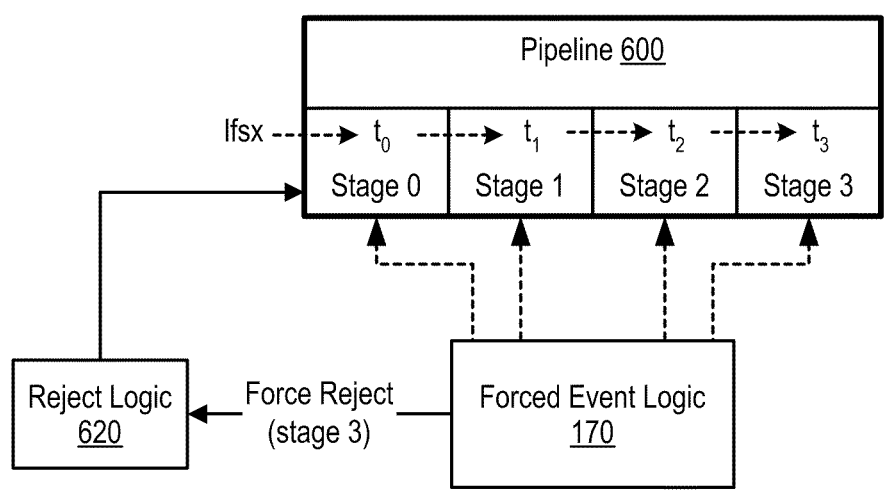
FIG. 6 is an exemplary diagram of forced event logic invoking a forced event based upon a particular pipeline trigger stage.

FIG. 6 is an exemplary diagram of forced event logic invoking a forced event based upon a particular pipeline trigger stage. The embodiment in FIG. 6 shows that pipeline 600 includes four stages, which are stages 0-3. As an execution unit loads an instruction (lfsx) into pipeline 600 at stage 0, forced event logic 170 monitors its progress through the various stages. When forced event logic 170 detects that the instruction enters a pipeline stage that corresponds to a pipeline trigger stage (specified by pipeline trigger stage bits included in the forced event bits), forced event logic 170 invokes the forced event. The embodiment shown in FIG. 6 shows that forced event logic 170 invokes a forced "reject" event to reject logic 620 when instruction "lfsx" enters pipeline 600's stage 3.

Figure 7:
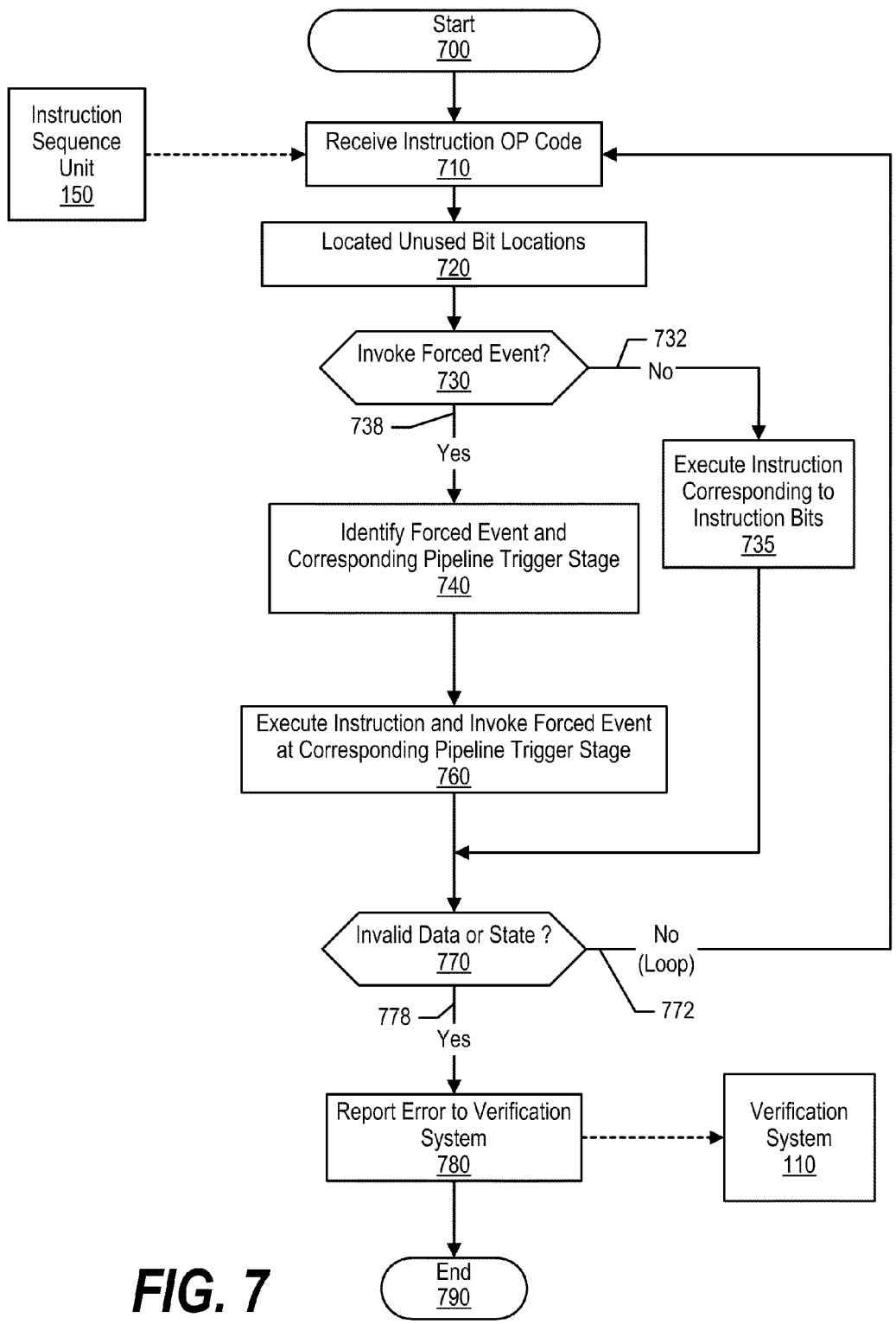
FIG. 7 is a flowchart showing steps taken in an execution unit invoking a forced event in response to identifying forced event bits included in an instruction OP code's unused bit locations.

FIG. 7 is a flowchart showing steps taken in an execution unit invoking a forced event in response to identifying forced event bits included in an instruction OP code's unused bit locations. Processing commences at 700, whereupon processing receives an instruction OP code from instruction sequencing unit 150 at step 710. Instruction sequencing unit 150 is the same as that shown in FIG. 1 and, as discussed earlier, passes the instruction OP code to a particular execution unit based upon the instruction OP code's type. As discussed herein, the instruction OP code includes instruction bits and may include forced event bits in the instruction OP code's unused bit locations.

At step 720, processing locates the instruction OP code's unused bit locations, and a determination is made as to whether the unused bit locations include forced event bits (decision 730). In one embodiment, the forced event bits may include bits that identify a particular forced event as well as bits that identify a particular pipeline stage at which to invoke the forced event (see FIG. 5B and corresponding text for further details). In another embodiment, the forced event bits may include a bit that provides an indication to invoke a forced event, such as a forced event that was previously configured based upon predefined event parameters (see FIGS. 3-4 and corresponding text for further details).

If the unused bit locations do not include forced event bits (e.g., all "0's"), decision 730 branches to "No" branch 732, whereupon processing executes the instruction corresponding to the instruction bits (e.g., loads the instruction bits into an execution pipeline for execution).

On the other hand, if the unused bit locations include forced event bits, decision 730 branches to "Yes" branch 738, whereupon processing analyzes the forced event bits in order to identify the forced event (e.g., flush, reject, etc.) and also identify whether a particular pipeline trigger stage is specified (e.g., stage 0, 1, etc.) (step 740). At step 760, processing executes the instruction and invokes the forced event when the instruction bits reach a pipeline stage corresponding to the pipeline trigger stage (if applicable).

A determination is made as to whether the forced event produced invalid data, such as erroneous data or enters an invalid state (decision 770). For example, a particular latch state reaches an invalid state, or two load/store unit signals that should not be active at the same time are active due to the forced event. If the forced event did not produce invalid data, decision 770 branches to "No" branch 772, which loops back to receive another instruction OP code. On the other hand, if the forced event produced invalid data, decision 770 branches to "Yes" branch 778, whereupon processing reports an error to verification system 110 at step 780. Processing ends at 790.

Figure 8:
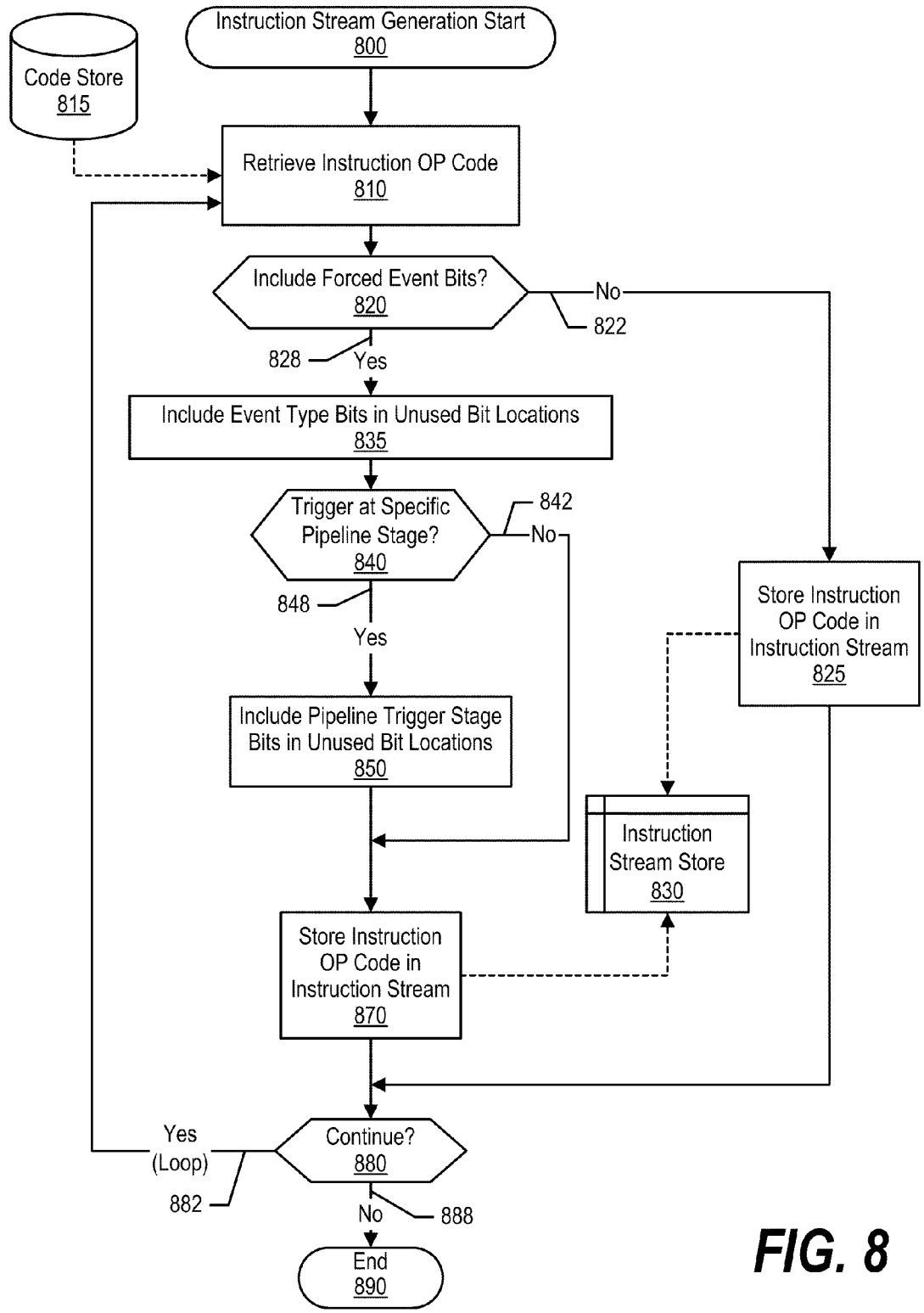
FIG. 8 is a flowchart showing steps taken in a verification system adding forced event bits into instruction OP code unused bit locations.

FIG. 8 is a flowchart showing steps taken in a verification system adding forced event bits into instruction OP code unused bit locations. Processing commences at 800, whereupon processing retrieves an instruction OP code from code store 815 at step 810. A determination is made as to whether to include forced event bits into the retrieved instruction OP code's unused bit locations (decision 820).

If processing should not include forced event bits into the unused bit locations, decision 820 branches to "No" branch 822 whereupon processing stores the instruction in an instruction stream (e.g., instruction stream 120) located in instruction stream store 830.

On the other hand, if processing should include forced event bits into the unused bit locations, decision 820 branches to "Yes" branch 828, whereupon processing includes event type bits into the unused bit locations at step 835, which indicate the type of forced event (e.g., flush, reset, etc.). A determination is made as to whether to trigger the forced event at a particular pipeline trigger stage (decision 840). For example, a "flush" forced event may be triggered at a pipeline trigger stage "2."

If the forced event should trigger when the corresponding instruction bits reach a particular pipeline stage, decision 840 branches to "Yes" branch 848, whereupon processing includes pipeline trigger stage bits in the instruction OP code's unused bit locations that specify a particular pipeline stage to invoke the forced event. On the other hand, if the forced event is not required to trigger at a particular pipeline stage, decision 840 branches to "No" branch 842, bypassing step 850. For example, as a default, when a particular pipeline trigger stage is not specified, forced event logic may trigger a forced event when the corresponding instruction bits enter pipeline stage 0. At step 870, processing stores the instruction OP code (includes the forced event bits) in instruction stream store 830.

In one embodiment discussed earlier, instead of including forced event bits into an instruction OP code's unused bit locations, a verification system may modify unused instruction OP codes (NO-OP instructions) into "forced event" OP codes that are devoid of instruction bits. In this embodiment, the verification system includes the forced event OP codes into instruction stream 830 at appropriate locations.

A determination is made as to whether there are more instruction OP codes to process (decision 880). If there are more instruction OP codes to process, decision 880 branches to "Yes" branch 882, which loops back to retrieve and process the next instruction OP code. This looping continues until there are no more instruction OP codes to process, at which point decision 880 branches to "No" branch 888, whereupon processing ends at 890.

Figure 9:
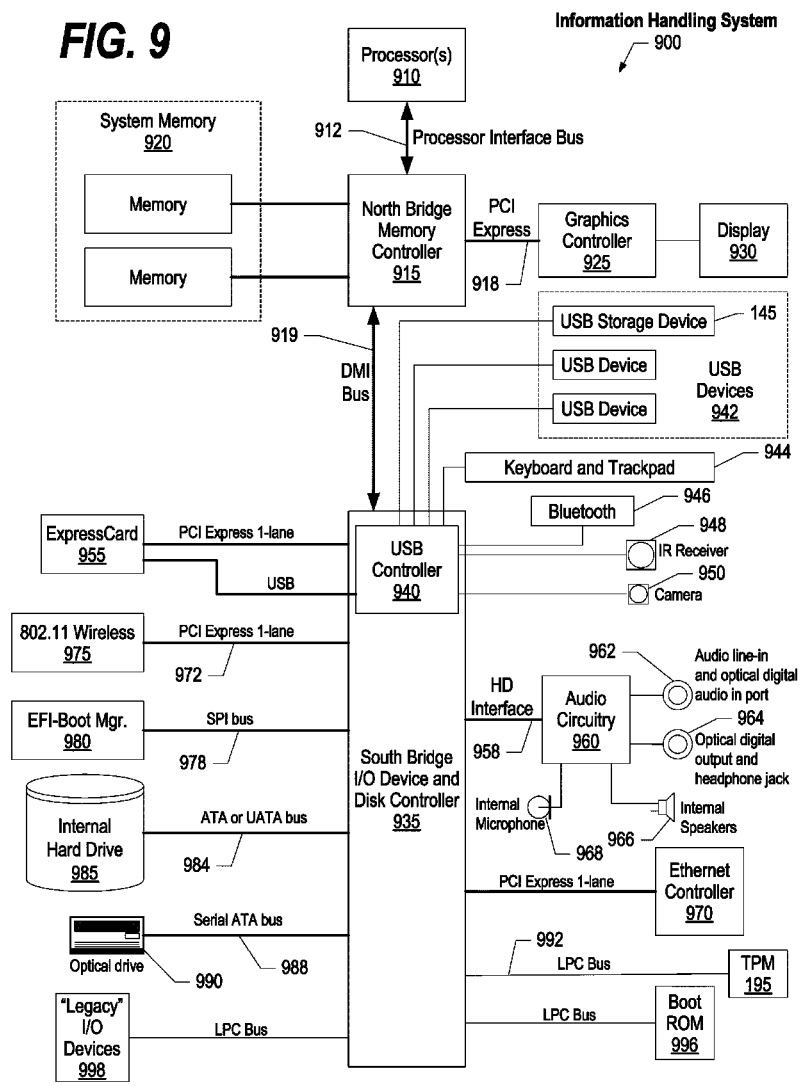
FIG. 9 is a block diagram example of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wirelessly communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
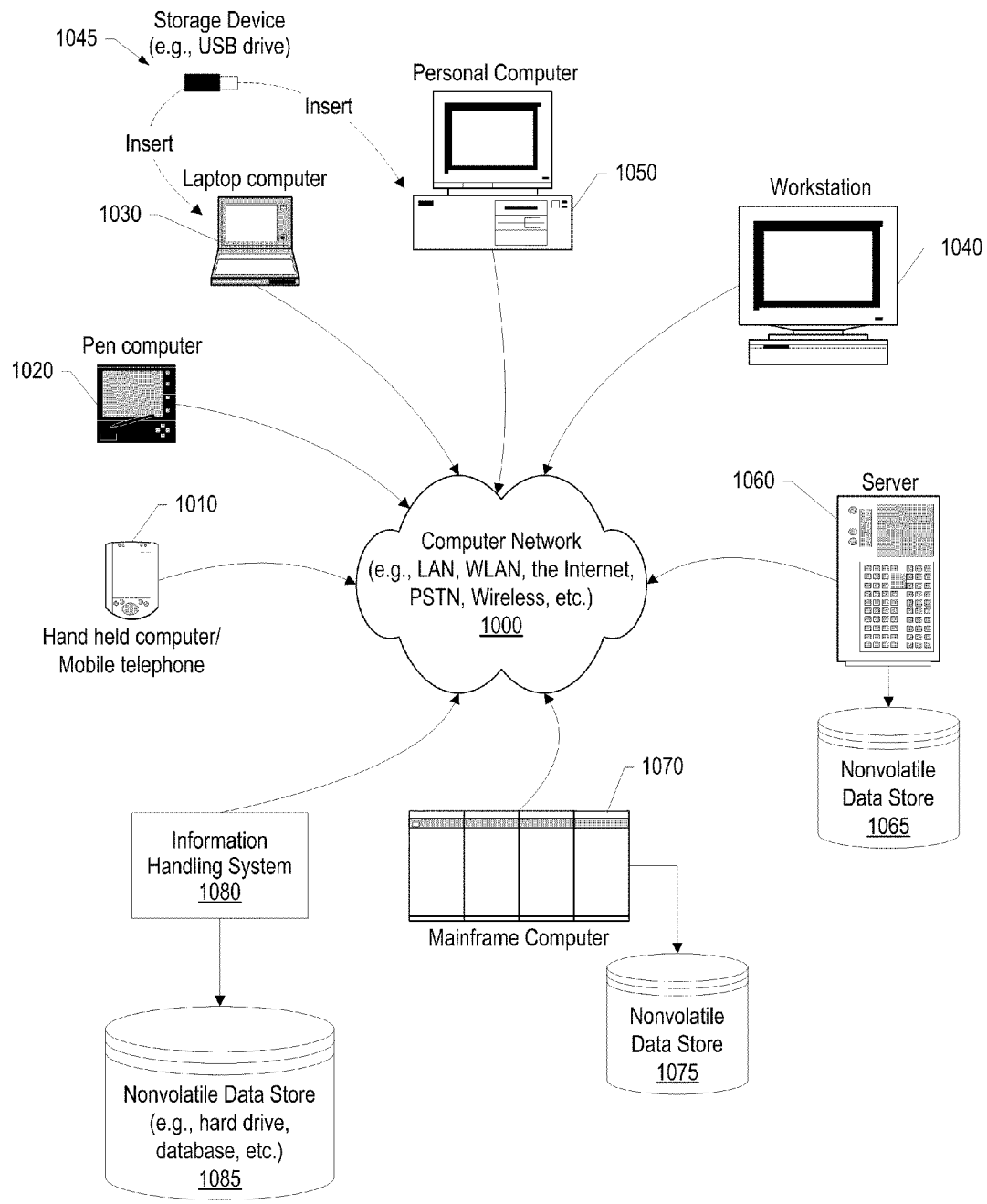
FIG. 10 provides an extension example of the information handling system environment shown in FIG. 9 to illustrate that the methods described herein can be performed on a wide variety of information handling systems which operate in a networked environment.

FIG. 10 provides an extension example of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 1045 can be shared among two or more information handling systems using various techniques, such as connecting the removable nonvolatile storage device 1045 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A processor-implemented method comprising:
receiving an instruction operation (OP) code at a processor that includes one or more instruction bits, one or more event type bits, and one or more pipeline trigger stage bits, wherein the one or more event type bits identify a forced event that is unrelated to an instruction corresponding to the one or more instruction bits, and wherein the one or more pipeline trigger stage bits specify one of a plurality of pipeline stages of an execution unit pipeline included in an execution unit of the processor;
loading the one or more instruction bits into the execution unit pipeline; and
executing the forced event in response to a determination that, during execution of the one or more instruction bits, the one or more instruction bits reaches the specified one of the plurality of pipeline stages in the execution unit pipeline.

2. The method of claim 1 further comprising:
determining, by verification logic included in the processor, whether the execution unit generated invalid data in response to the execution of the forced event; and
reporting, by the verification logic, an error to a verification system in response to determining that the execution unit generated the invalid data.

3. The method of claim 1 further comprising:
prior to receiving the instruction OP code, receiving predefined forced event parameters from a verification system at the processor; and
configuring forced event logic based upon the predefined forced event parameters, wherein the configuring results in identifying the forced event.

4. The method of claim 1 wherein a verification system provides the instruction OP code, and wherein, prior to providing the instruction OP code, the verification system further performs actions of:
selecting one or more unused bit locations included in the instruction OP code; and
including the forced event bits into the one or more unused bit locations.

5. The method of claim 1 further comprising:
receiving a forced event OP code at the processor, wherein the forced event OP code is devoid of the one or more instruction bits; and
executing the forced event in response to receiving the forced event OP code.

6. The method of claim 1 wherein the forced event is selected from the group consisting of a forced flush event, a forced reject event, a forced error-inject event, and a forced cache-miss event.

7. An information handling system comprising:
one or more processors, wherein at least one of the processors includes an execution unit;
a memory that stores one or more instruction operation (OP) codes, the memory coupled to at least one of the processors;
a set of instructions stored in the memory and executed by at least one of the processors in order to perform actions of:
retrieving one of the instruction operation (OP) codes, wherein the retrieved instruction OP code includes one or more instruction bits, one or more event type bits, and one or more pipeline trigger stage bits, wherein the one or more event type bits identify a forced event that is unrelated to an instruction corresponding to the one or more instruction bits, and wherein the one or more pipeline trigger stage bits specify one of a plurality of pipeline stages of an execution unit pipeline included in the execution unit;
loading the one or more instruction bits into the execution unit pipeline; and
executing the forced event in response to a determination that, during execution of the one or more instruction bits, the one or more instruction bits reaches the specified one of the plurality of pipeline stages in the execution unit pipeline.

8. The information handling system of claim 7 wherein the set of instructions performs actions of:
determining whether invalid data is generated in response to the execution of the forced event; and
reporting an error to a verification system in response to determining that the forced event execution generates the invalid data.

9. The information handling system of claim 7 wherein the set of instructions performs actions of:
prior to retrieving the instruction OP code, receiving predefined forced event parameters from a verification system; and
configuring forced event logic based upon the predefined forced event parameters, wherein the configuring results in identifying the forced event.

10. The information handling system of claim 7 wherein a verification system provides the retrieved instruction OP code, and wherein, prior to providing the retrieved instruction OP code, the verification system performs actions of:
selecting one or more unused bit locations included in the retrieved instruction OP code; and
including the forced event bits into the one or more unused bit locations.

11. The information handling system of claim 7 wherein the set of instructions performs actions of:
receiving a forced event OP code at the processor, wherein the forced event OP code is devoid of the one or more instruction bits; and
executing the forced event in response to receiving the forced event OP code.

12. The information handling system of claim 7 wherein the forced event is selected from the group consisting of a forced flush event, a forced reject event, a forced error-inject event, and a forced cache-miss event.

13. A computer program product stored in a non-transitory computer readable storage medium, comprising functional descriptive material that, when executed by an information handling system, causes the information handling system to perform actions that include:
receiving an instruction operation (OP) code, wherein the instruction OP code includes one or more instruction bits, one or more event type bits, and one or more pipeline trigger stage bits, wherein the one or more event type bits identify a forced event that is unrelated to an instruction corresponding to the one or more instruction bits, and wherein the one or more pipeline trigger stage bits specify one of a plurality of pipeline stages of an execution unit pipeline included in an execution unit;
loading the one or more instruction bits into the execution unit pipeline; and executing the forced event in response to a determination that, during execution of the one or more instruction bits, the one or more instruction bits reaches the specified one of the plurality of pipeline stages in the execution unit pipeline.

14. The computer program product of claim 13 wherein the information handling system performs actions that include:
   determining whether invalid data is generated in response to the execution of the forced event; and
   reporting an error to a verification system in response to determining that the forced event execution generates the invalid data.

15. The computer program product of claim 13 wherein the information handling system performs actions that include:
   prior to receiving the instruction OP code, receiving predefined forced event parameters from a verification system; and
   configuring forced event logic based upon the predefined forced event parameters, wherein the configuring results in identifying the forced event.

16. The computer program product of claim 13 wherein a verification system provides the instruction OP code, and wherein, prior to providing the instruction OP code, the verification system performs actions of:
   selecting one or more unused bit locations included in the instruction OP code; and
   including the forced event bits into the one or more unused bit locations.

17. The computer program product of claim 13 wherein the information handling system performs actions that include:
   receiving a forced event OP code at the processor, wherein the forced event OP code is devoid of the one or more instruction bits; and
   executing the forced event in response to receiving the forced event OP code.

18. The computer program product of claim 13 wherein the forced event is selected from the group consisting of a forced flush event, a forced reject event, a forced error-inject event and a forced cache-miss event.

19. A processor comprising:
   an instruction sequencing unit;
   a hardware execution unit that receives an instruction operation (OP) code from the instruction sequencing unit, wherein the instruction OP code includes one or more instruction bits, one or more event type bits, and one or more pipeline trigger stage bits, wherein the one or more event type bits identify a forced event that is unrelated to an instruction corresponding to the one or more instruction bits, and wherein the one or more pipeline trigger stage bits specify one of a plurality of pipeline stages of an execution unit pipeline included in the hardware execution unit, the hardware execution unit further comprising:
      instruction loading logic that loads the one or more instruction bits into the execution unit pipeline; and
      forced event logic for invoking the forced event in response to a determination that, during execution of the one or more instruction bits, the one or more instruction bits reaches the specified one of the plurality of pipeline stages in the execution unit pipeline.

20. The processor of claim 19 further comprising:
   verification logic that reports an error to a verification system in response to determining that the execution unit generated invalid data.

21. The processor of claim 19 wherein the forced event is selected from the group consisting of a forced flush event, a forced reject event, a forced error-inject event, a forced cache-miss event, and a forced opcode-completion-delay event.

* * * * *